United States Patent
Husøy

(10) Patent No.: US 8,260,011 B2
(45) Date of Patent: Sep. 4, 2012

(54) METHOD, SYSTEM, AND COMPUTER READABLE MEDIUM FOR FACE DETECTION

(75) Inventor: Per Ove Husøy, Oslo (NO)

(73) Assignee: Cisco Technology, Inc., San Jose, CA (US)

( * ) Notice: Subject to any disclaimer, the term of this patent is extended or adjusted under 35 U.S.C. 154(b) by 390 days.

(21) Appl. No.: 12/642,390

(22) Filed: Dec. 18, 2009

(65) Prior Publication Data

US 2010/0172581 A1    Jul. 8, 2010

(30) Foreign Application Priority Data

Dec. 19, 2008  (NO) .................................. 20085322

(51) Int. Cl.
G06K 9/00       (2006.01)
(52) U.S. Cl. ...................... 382/118; 382/165; 382/170
(58) Field of Classification Search .................. 382/118, 382/165, 170

See application file for complete search history.

(56) References Cited

U.S. PATENT DOCUMENTS

| | | | | |
|---|---|---|---|---|
| 7,187,783 | B2* | 3/2007 | Moon et al. | 382/103 |
| 7,283,668 | B2* | 10/2007 | Moon et al. | 382/168 |
| 7,333,653 | B2* | 2/2008 | Luo et al. | 382/165 |
| 7,336,830 | B2* | 2/2008 | Porter et al. | 382/218 |
| 2004/0017930 | A1 | 1/2004 | Kim | |
| 2008/0192840 | A1* | 8/2008 | Hua et al. | 375/240.26 |
| 2011/0301441 | A1* | 12/2011 | Bandic et al. | 600/306 |
| 2012/0027270 | A1* | 2/2012 | Kyyko et al. | 382/118 |

FOREIGN PATENT DOCUMENTS

EP    1 950 688    7/2008

OTHER PUBLICATIONS

Tae-Woong Yoo, Il-Seok Oh, "A fast algorithm for tracking human faces based on chromatic histograms," Pattern Recognition Letters, vol. 20, Issue 10, Oct. 1999, pp. 967-978.*

Karl Schwerdt and James L. Crowley, "Robust Face Tracking using Color," 4th IEEE International Conference on Automatic Face and Gesture Recognition, 2000, pp. 90-95.*

Schiele, Bernt, et al. "Gaze Tracking Based on Face-Color" International Workshop on Automatic Face-and Gesture-Recognition pp. 344-349, Jun. 26-28, 1995: Zurich, Switzerland.

Hunke, Martin, et al. "Face Locating and Tracking for Human-Computer Interaction." Signals, Systems and Computers, 1994. vol. 2, pp. 1277-1281, Oct. 31-Nov. 2, 1994.

(Continued)

*Primary Examiner* — Bhavesh Mehta
*Assistant Examiner* — Utpal Shah
(74) *Attorney, Agent, or Firm* — Oblon, Spivak, McClelland, Maier & Neustadt, L.L.P.

(57) ABSTRACT

A method, system, and computer readable medium for detecting a face in a video stream including receiving a sequence of input color images; and for each input image, calculating a greyscale image of the input color image, creating a one-bit motion image based on the current and a previous greyscale image, calculating a normalized color image of the input color image, calculating a motion color probability image, providing at least the grayscale image and the motion color probability image to a face detector, and executing face detection by determining a presence of a face based on first features in the grayscale image and second features in the motion color probability image.

20 Claims, 5 Drawing Sheets

OTHER PUBLICATIONS

Hunke, Martin H. "Locating and Tracking of Human Faces with Neural Networks." Internet Citation, [online], Aug. 1, 1994, p. 82pp, Retrieved from the Internet: URL:http://reference.kfupm.edu.sa/content/l/o/locating_and_tracking_of_human_faces_wit_522647.pdf [retrieved on Jun. 30, 2009].

Graf H.P., et al. "Multi-modal system for locating heads and faces" IEEE Comput. Soc, US, Oct. 14, 1996, pp. 88-93.

Lee, C.H., et al. "Automatic human face location in a complex background using motion and color information" Pattern Recognition, vol. 29, No. 11, pp. 1877-1889, Nov. 1, 1996.

Viola, P., et al. "Robust real-time object detection" Second International Workshop on Statistical and Computational Theories of Vision-Modeling, Learning, Computing, and Sampling, Vancouver, Canada, Jul. 13, 2001.

Pentland, A., et al. "View-based and modular eigenspaces for face recognition" M.I.T. Media Laboratory Perceptual Computing Section Technical Report No. 245, Appeared in: IEEE Conference on Computer Vision & Pattern Recognition, pp. 84-91, Jun. 1994.

Bichsel, M. et al. "Human face recognition and the face image set's topology" CVGIP: Image Understanding, 59:254-261, 1994.

Schapire, R. E. "The boosting approach to machine learning: An overview" MSRI Workshop on Nonlinear Estimation and Classification, 2002.

Serre, T., et al. "Feature selection for face detection" Massachusetts Institute of Technology, 2000.

Freund, Y., et al. "A decision-theoretic generalization of on-line learning and an application to boosting" Journal of Computer and System sciences, 55(1): 119-139, Aug. 1997.

Wang, J.J. et al. "Video Analysis of Human Dynamics-A Survey" XP004472531, vol. 9, No. 5, pp. 320-345, Oct. 1, 2003.

Extended European Search Report issued May 16, 2012, in connection with counterpart European Patent Application No. 09833678.7.

\* cited by examiner

METHOD, SYSTEM, AND COMPUTER READABLE MEDIUM FOR FACE DETECTION

CROSS-REFERENCE TO RELATED APPLICATIONS

The present application claims priority under 35 U.S.C. §119 from Norwegian Patent Application No. 20085322, filed Dec. 19, 2008, the entire subject matter of which is incorporated herein by reference.

BACKGROUND

1. Field of the Invention

The present disclosure relates to a method and systems for detecting one or more faces within a digital image.

2. Description of the Related Art

Detection of faces or heads in images is an ability in video conferencing systems and other types of video systems. Systems having a video image capturing device (e.g., video cameras, video conferencing equipment, web cameras, or the like) facilitate functionality such as, but not limited to, optimum view definition, area targeting for focusing purposes (to ensure that the individuals in the video are in focus), color optimization (to ensure correct face colors), or the like.

Face detection requires the face detecting device (or logic) to examine or process thousands, if not millions, of candidate windows within one digital image in an effort to locate portion(s) of a video frame (or image) that may contain a human face. Conventional techniques call for the image data within the candidate windows to be manipulated and examined in various different positions and/or scales. Such processing can lead to slow detection speeds.

A variety of face detection techniques are known and continue to be adapted and improved upon. The following is a list of some exemplary references, the entire contents of which are hereby incorporated by reference:

[1] P. Viola and M. Jones. "Robust real time object detection." IEEE ICCV Workshop on Statistical and Computational Theories of Vision, Vancouver, Canada, Jul. 13, 2001.

[2] A. Pentland, B. Moghaddam, and T. Starner. "View-based and Modular Eigenspaces of Face Recognition." Proc. of IEEE Computer Soc. Conf. on Computer Vision and Pattern Recognition, pp. 84-91, June 1994. Seattle, Wash.

[3] M. Bichsel and A. P. Pentland. "Human face recognition and the face image set's topology." CVGIP: Image Understanding, 59:254-261, 1994.

[4] R. E. Schapire. "The boosting approach to machine learning: An overview." MSRI Workshop on Nonlinear Estimation and Classification, 2002.

[5] T. Serre, et al. "Feature selection for face detection." AI Memo 1697, Massachusetts Institute of Technology, 2000.

[6] V. N. Vapnik. Statistical Learning Theory. John Wiley and Sons, Inc., New York, 1998.

[7] Y. Freund and R. E. Schapire. "A decision-theoretic generalization of on-line learning and an application to boosting." Journal of Computer and System Sciences, 55(1):119-139, August 1997.

Several approaches exist for the detection of faces in images. One of the faster methods today, developed for single-frame analysis, is the cascaded classifier using Haar similar features, found in P. Viola and M. Jones, "Robust real time object detection," listed above. Viola and Jones use a series (termed a cascade) of trained classifiers. These cascades are trained on large sets of images, both with and without faces, (termed positive and negative samples) to learn distinguishing features of a face. When applied to an image (in this case, a single frame from a video), each classifier from the cascade is applied to regions (or windows) of the image, where the size of the window increases for each iteration. In the Viola and Jones method, the detector is based on local geometric features in a gray-level image of a scene. One typical classifier, for example, is dark eye-caves compared to brighter surroundings, or the like. However, the method of Viola and Jones only considers facial features for each window (or region), and needs to process each region for facial features before it determines if it contains a face or not. As a result, there is a high processing load on the system performing the method because detailed analysis must be performed on an image even in regions where, for example, color may suggest that no face exists.

A conventional method of reducing the number of candidate windows that need to be processed and examined is by defining a set of colors (i.e., face colors) presumed to be colors found in regions of the image representing a face. Thus, the face detection unit may only process and examine the parts of the image containing pixels having colors corresponding with the defined set of face colors. However, numerous video systems, such as, but not limited to, video conferencing equipment, are typically placed in a variety of different environments with very different illumination and lighting conditions. Video conferencing endpoints are often placed on desktops near windows (giving varied illumination even if the system remains stationary), in well and poorly lit meeting rooms, in large lecture halls, in conference rooms with skin toned furniture or walls, or the like.

Therefore, despite the value of the region color for classifying faces, the variability in measured skin color between different illuminations is quite large, making it difficult to utilize. Additionally, in images containing skin colored walls or furniture, the face detection logic would still spend computational time on large areas not containing faces. Therefore, it is impossible to know the actual color of skin in an image before a reliable face detection is achieved.

Further, in conventional systems, the explicit use of the skin color for face detection, and the dependency of the registered color on the used illumination make it difficult to make a robust detector.

SUMMARY

The present disclosure discloses a method, system, and computer readable medium. By way of example, there is a method for detecting a face in a video stream including receiving, at a video processing apparatus, a sequence of input color images; and for each input image, processing the sequence at the video processing apparatus, wherein the process includes, calculating a greyscale image of the input color image, creating a one-bit motion image based on the current greyscale image and a previous greyscale image, calculating a normalized color image of the input color image, calculating a motion color probability image by, calculating a first color histogram of the pixels in the normalized image, calculating a second color histogram of the pixels in the normalized image corresponding to pixels in the motion image defined as being in motion, calculating a ratio histogram by dividing the first color histogram by the second color histogram, and setting pixel values in the motion color probability image to a value obtained by indexing the ratio histogram using values from the original normalized image, providing at least the grayscale image and the motion color probability image to a face detector, and executing face detection by determining a presence of a face based on first features in the grayscale image and second features in the motion color probability image.

As should be apparent, a number of advantageous features and benefits are available by way of the disclosed embodiments and extensions thereof. It is to be understood that any embodiment can be constructed to include one or more features or benefits of embodiments disclosed herein, but not others. Accordingly, it is to be understood that the embodiments discussed herein are provided as examples and are not to be construed as limiting, particularly since embodiments can be formed to practice the invention that do not include each of the features of the disclosed examples.

BRIEF DESCRIPTION OF THE DRAWINGS

The disclosure will be better understood from reading the description which follows and from examining the accompanying figures. These are provided solely as non-limiting examples of embodiments. In the drawings.

DETAILED DESCRIPTION

The present disclosure provides a method, and system, and computer readable medium that increase the face detection speed by reducing the number of candidate windows that need to be processed and examined by other more complex and/or time-consuming face detection processes. Further, the present disclosure provides a more robust face detection method, system, and computer readable medium more independent of lighting conditions, than conventional face detection methods, systems, and computer readable mediums.

In a setting where a video (i.e., sequence of images or frames) is captured by a static camera (e.g., video conferencing, studio filming, web-cameras, or the like), information gathered over a sequence of frames may be used to improve face detection processes. Typically a region of an image containing motion or a region having a color similar to skin color are good candidate regions for searching for a face. However, since the color of a face may vary in a captured video frame as a function of the illumination at the time and place the video frame was captured, the exemplary embodiments described herein utilize knowledge of the color of regions in motion rather than the notion of knowing skin color.

Figure 1:
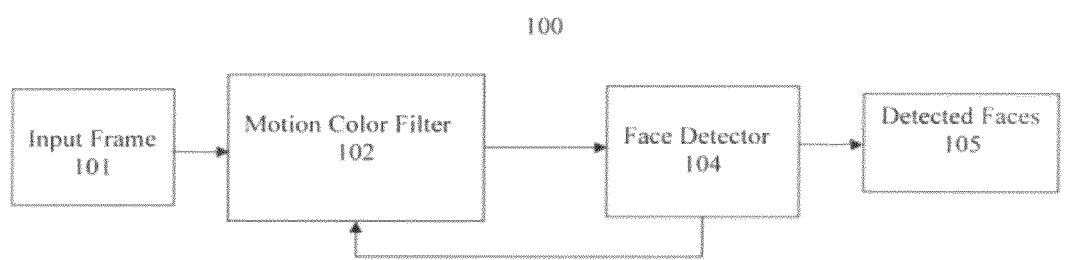
FIG. 1 is a block diagram illustrating an exemplary system configuration to speed up face detection.

FIG. 1 depicts an exemplary technique 100 for detecting faces. In block 101 an actual input image of a sequence of images from a video stream in which a face is to be detected is provided to the system. Here, the input image is provided to a Motion Color filter 102. An input image includes, for example, raw digital image data. Motion Color filter 102 is configured to process the input image and, based on the input image, output a set of corresponding processed images. The set of processed images include, at least, an image containing intensity information and an image containing probable skin color information. According to an embodiment, the set of processed images also may include an image containing motion information. The processed images are then provided to, or otherwise accessed by, the face detector 104. Note that in arrangement 100, Motion Color filter 102 is configured as a pre-filter. The Motion Color filter 102 may also be an integral part of the face detection logic, and not a separate step. The Motion Color filter 102 is described in greater detail below.

The face detector 104 may utilize different types of face detection methods, such as, but not limited to, facial feature detectors, eigenvector (eigenfaces) based detectors, or the like. An exemplary embodiment uses a face detector 104 that employs, at least, features in a grayscale image (intensity information) and probable skin color information to classify candidate windows (or regions) as having face data or as not having face data. The probable skin color information is information defining the regions of the frame that, with high probability, contain skin color, independent of the lighting conditions in which the video stream has been captured. According to one embodiment, motion information, which is information defining the regions of the frame that contain motion, is used in addition to the intensity and probable skin color information to classify candidate windows.

The face detector 104, in this example, is configured to output detected faces 105. Detected faces 105 may include, for example, specified portions of input image 101 that are likely to include face data. The face detector 104 is described in greater detail below.

To examine if a face is located within an input image, a large number of candidate windows are examined at many different possible positions and/or many different scales. One of the more effective ways to accelerate face detection, therefore, is to quickly determine if a candidate window needs to be processed further, or if it can be disregarded. This is done, in the face detector 104, by a classifier which allows background regions of the image to be quickly discarded while spending more computation on potential face-like regions. Unlike the approach described by Viola & Jones, which only uses Haar features in their classifier, an embodiment described herein includes a multi-modal classifier that utilizes several different features from several different derived input images to discard uninteresting regions (i.e., non face-like regions) of the image more rapidly. The Motion Color filter 102 provides the face detector 104 with information about which parts of the input image contain colors which are likely to be skin colors. In one exemplary embodiment, "likely" is set to be more than 50%. Other embodiments may be more or less.

By way of example, the pixel color information of the input image includes red, green, and blue color information (e.g., an RGB color space). However, this is not limiting to the scope of the present disclosure. A person skilled in the art may perform the same steps on an input image with pixel color information in other color spaces, such as, but not limited to, luminance and chrominance information (e.g., a YCrCb color space).

Figure 2:
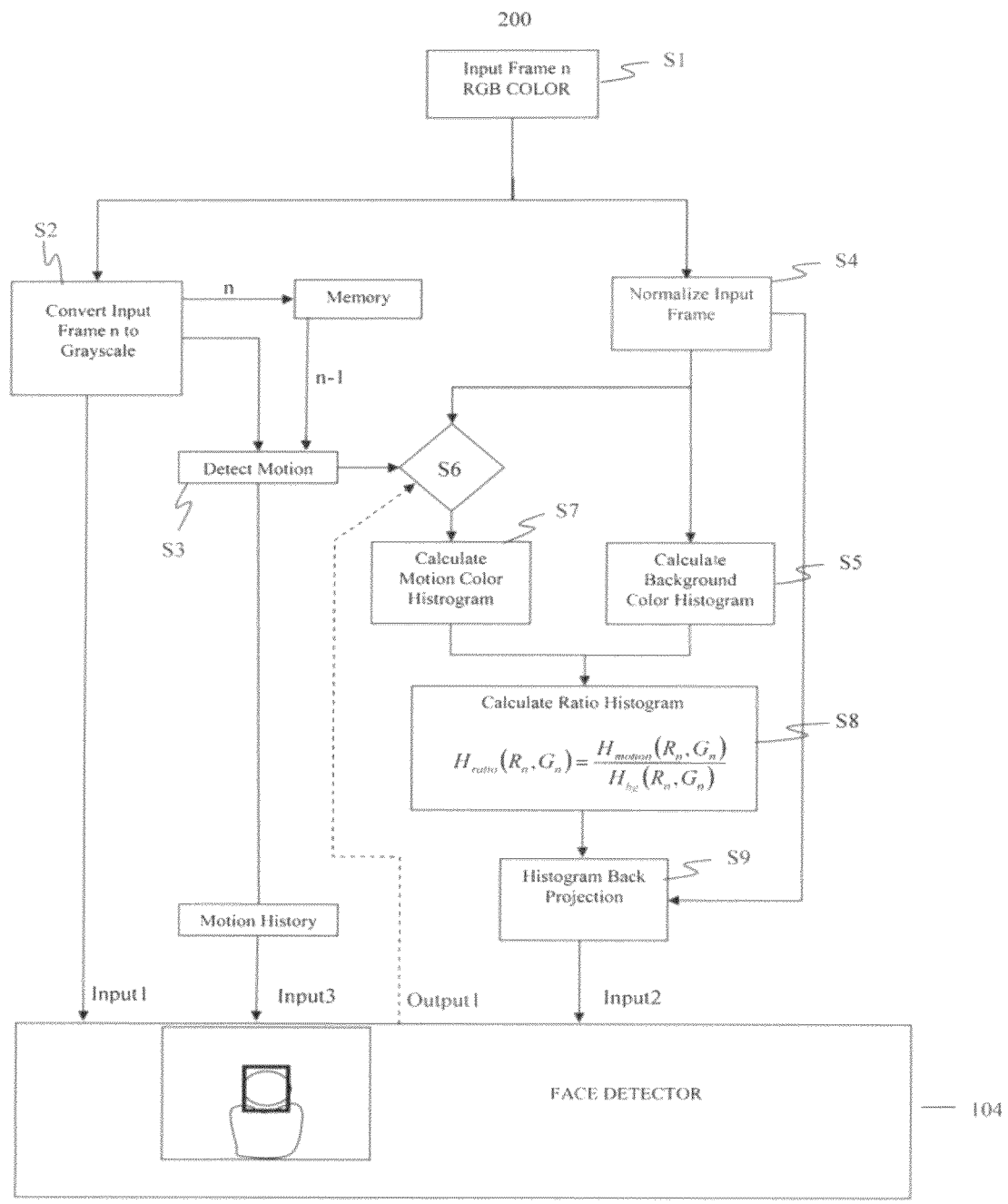
FIG. 2 is a diagram depicting an embodiment of the logic configured to speed up face detection, in accordance with certain embodiments of the present disclosure.
Figure 3:
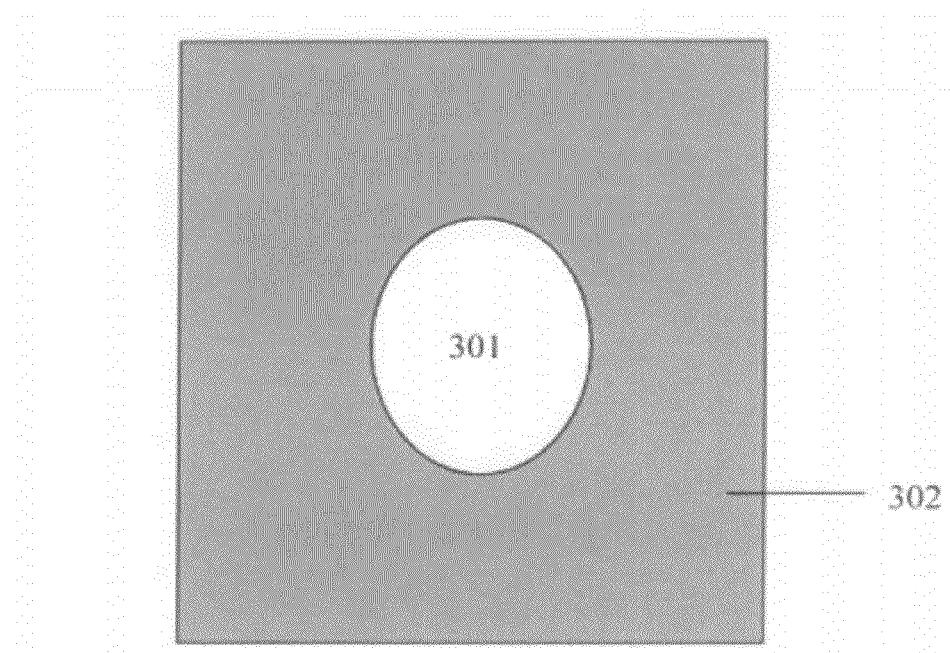
FIG. 3 shows an embodiment of an input image containing a face.

FIG. 2 is a flow diagram depicting an exemplary method 200 which may, but does not have to, be implemented in the Motion Color filter 102. In step S1, the face Motion Color filter 102 receives a digital input image 101 (i.e., a frame of a video stream). A digital input image 101 may be an image as shown in FIG. 3, which includes a face 301 with skin color in front of a uniform background 302 of a different color. A copy of the received input image is then converted, at step S2, into a grayscale image, which is an image in which the value of each pixel carries intensity information. Images of this sort are composed exclusively of shades of gray, varying from black at the weakest intensity to white at the strongest intensity. The grayscale image is temporarily stored in an internal or external memory device for later processing. The grayscale digital image is then used to detect motion, at step S3, in the video stream. The detection process may be either a region based frame difference, or any approach is which, with reasonable sensitivity, detects moving objects. Different conventional methods may be used to detect motion in a video signal. One example of an algorithm for motion detection by a fixed camera is comparing the current image (n) with the previous image (n−1) and finding the pixels (or blocks of pixels) in the current image (n) that are different from the corresponding pixels (or blocks of pixels) in the previous image (n−1).

Accordingly, in step S3, a motion image is generated based on the current grayscale image and the previous grayscale image stored in the internal memory device. The motion image is a one-bit black and white digital image, having black pixels in areas with no detected motion and white pixels in areas with detected motion (or vice versa). In step S3, a copy of the received input image (in this case, an RGB image) is then converted into a normalized image in the RG chromaticity space. In the RG chromaticity space, a color is represented by the proportion of red, green, and blue in the color, rather than by the intensity of each color (as is done in an RGB color space). By normalizing the magnitude of the RGB pixel triplets (e.g., by calculating chromaticity), the image variations due to lighting geometry can be removed.

Next, in step S4 a normalized image is generated, from the input image, by computing an intensity insensitive color measure (Rn and Gn) for each pixel, by dividing the element values of the original RGB vector by the sum of the element values. Since the sum of these measures add up to one (1), the color of any RGB triplet can be uniquely specified by a two element vector (i.e., the normalized [Rn, Gn] values). In a quantized form, [Rn, Gn] then defines a pixel color by a two-dimensional integer vector. The Rn and Gn values for each pixel in the normalized image can be calculated according to the following equations:

$$Rn = \frac{255*R}{R+B+G},$$
$$Gn = \frac{255*G}{R+B+G}.$$

In the above equation, R, B, and G are the element values of the Red, Blue, and Green colors, respectively, in the original RGB vector, and 255 is a scaling factor. As mentioned above, the Blue contribution is redundant because:

$Bn=1-Rn-Gn$.

For example, a pixel in a well lit face, or part of a face, may be represented by the linear RGB vector [200, 120, 60], representing a typical skin color. While a pixel in a dimly lit face, or another part of the face, may be represented by the linear RGB vector [20, 12, 6], caused by shadows or poor illumination. However, even though the two pixels have different RGB vectors and technically represent two different colors, the two pixels represent the same skin color, or the same ratio of Red, Green, and Blue combination. This is reflected by the normalized RnGn values (in this case, [134, 81]) which is the same for both pixels.

Next, based on at least the motion image and the normalized image, three histograms are calculated: a Background Color Histogram, a Motion Color Histogram, and a Motion Color Probability Histogram. The Motion Color Probability Histogram is a ratio of the Background Color Histogram and the Motion Color Histogram, and thus also called a Ratio Histogram. A histogram is a standard statistical description of a distribution in terms of occurrence frequencies of different event classes; for color, the event classes are regions in color space.

First, in step S5, a color histogram is calculated for the normalized image, hereinafter referred to as Background Color Histogram, since most of the image is assumed to contain "background" material. Since the normalized image is in a two-dimensional color space (i.e., RG chromaticity), the Background Color Histogram is a two-dimensional histogram that provides a compact summarization of the distribution of data in the normalized image. The Background Color Histogram indicates with what frequency each color occurs in the image, and is used for normalization purposes.)

$H(R_n,G_n)$=Number of pixels in a normalized image with color $Rn$, $Gn$.

Figure 4:
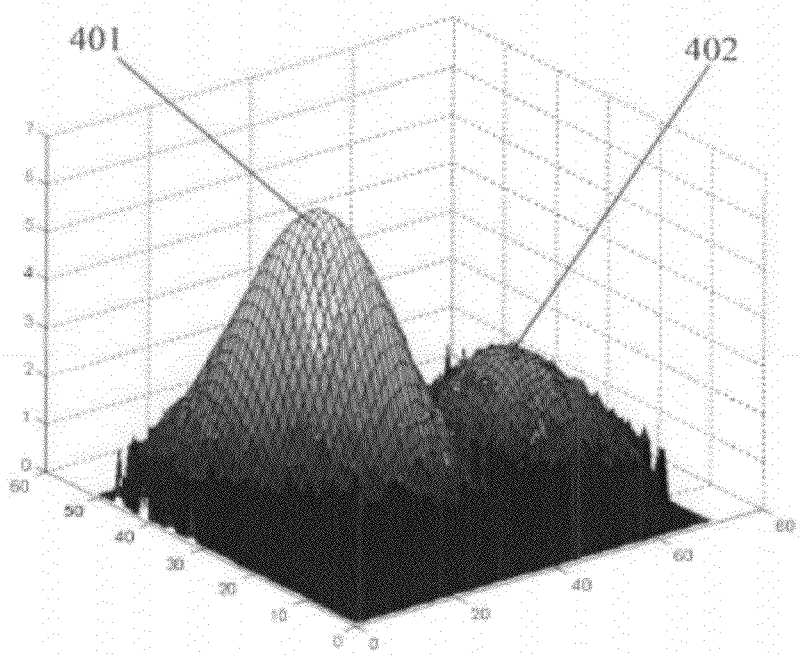
FIG. 4 shows an embodiment of a Background Color Histogram of the input image in FIG. 3.

A Background Color Histogram, calculated from the data in the input image in FIG. 3, is shown in FIG. 4. As can be seen in FIG. 4, the background color occurs most frequent and has the highest peak 401. The peak 402 represents the face and/or skin colors.

Next, in step S6, a Motion Color image is created. The Motion Color image is a combination of the motion image and the normalized image, which are two different representations of the same input image. The Motion Color image includes, for example, only the pixels from the normalized image that are detected as being in motion in the motion image.

Next, in step S7, a Motion Color Histogram is calculated for the Motion Color image. Since the background of an image (i.e., walls, furniture, ceiling, floor, or the like) is stationary, and a person rarely can remain completely still (even when actively trying), it may be assumed that a motion detected in the image reflects the presence of a person. The Motion Color Histogram is, therefore, created by calculating a color histogram of, for example, only the pixels in the normalized image which represent motion (i.e., the pixels detected as motion based on a detection method, as discussed above).

According to one embodiment, a Motion Color image may not be created in step S6. Instead, step S6, for example, may only define a set of pixels in the normalized image that are to be used in step S7, when calculating the Motion Color Histogram based on information from the motion image. The motion image contains information defining which pixels of the input image are detected as being in motion, and the position of those pixels. For example, only the pixels at the same pixel positions in the normalized image are then used for creating the Motion Color Histogram.

$H_{motion}(R_n,G_n)$=Number of pixels with normalized color $Rn$, $Gn$ in only the parts of the normalized image detected as being in motion.

Figure 5:
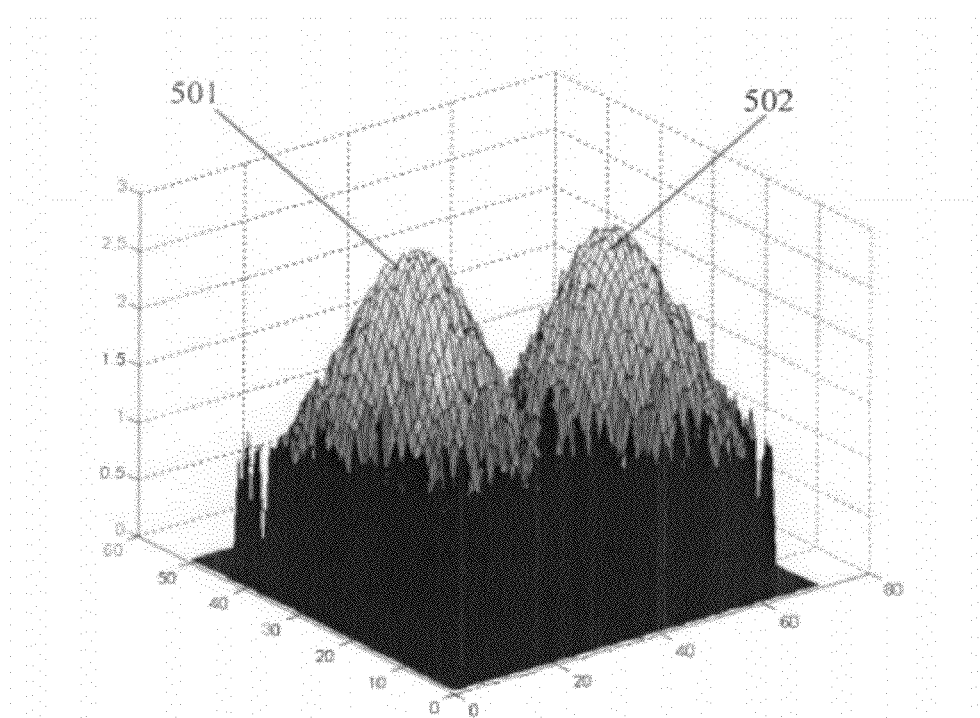
FIG. 5 shows an embodiment of a Motion Color Histogram in accordance with certain implementations of the present disclosure.

A Motion Color Histogram computed based on the input image in FIG. 3, and the motion image and normalized image derived therefrom, is shown in FIG. 5. As mentioned above, the Motion Color Histogram, for example, only includes pixels from regions containing motion. Changing lighting conditions (i.e., by the swaying curtains, or the like) may result in truly static parts of the image being detected as being in motion. Further, moving body parts of a person, covered in clothing, may contribute to non-skin colors in the Motion Color Histogram. Thus, as can be seen in FIG. 5, two peaks appear, which correspond to skin color 502 and background color 501, respectively. In contrast to the Background Color Histogram, the background color and skin color occur almost equally frequent and thus have similar peaks.

The Background Color Histogram gives the distribution of the colors in the overall scene, while the Motion Color Histogram gives the distribution of the colors of the detected moving parts of the scene. A Ratio Histogram $H_{ratio}$ describes the relationship between the Motion Color Histogram $H_{motion}$ of the region containing motion and the Background Color Histogram $H_{bg}$ of the entire normalized image.

Thus, a Ratio Histogram is next computed in step S8, by dividing the Motion Color Histogram by the Background Color Histogram. Since the Background Color Histogram has high values for static background colors, which occupy most of the image, and low values for assumed skin colors (e.g., given by motion), the Ratio Histogram gives low values for background colors and high values for colors in motion. The Ratio Histogram may be computed using the following formula:

$$H_{ratio}(R_n, G_n) = \frac{H_{motion}(R_n, G_n)}{H_{bg}(R_n, G_n)}.$$

Figure 6:
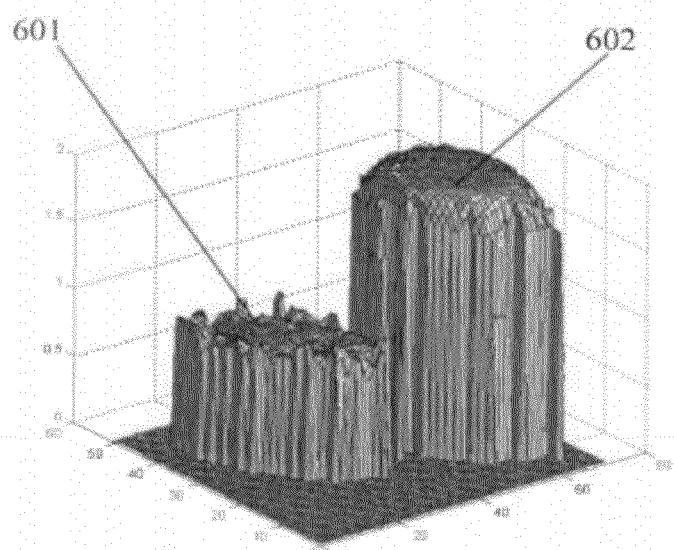
FIG. 6 shows an embodiment of a Ratio Histogram in accordance with certain implementations of the present disclosure.

A Ratio Histogram computed based on the input image in FIG. 3, and a Background Color Histogram and a Motion Color Histogram derived therefrom, is shown in FIG. 6. As can be seen from FIG. 6, the peak 602, which represents assumed skin colors, has considerably higher values than the rest of the colors 601 in the input image.

In step S9, a Motion Color Probability image is created by Back Projection. The Motion Color Probability image is created by setting all pixel values in the Motion Color Probability image to a value obtained by indexing the Ratio Histogram using values from the original normalized image. In other words, in step S9, the chromaticity values of each pixel in the normalized input image are traced onto the Ratio Histogram, and the corresponding frequency value is assigned to the same pixel in the normalized input image. This process produces bright pixels in the Motion Color Probability image where it is assumed that skin color appears, based on motion detection. In other words, the Motion Color Probability image contains information about which parts of the image are assumed to have skin colors.

According to an embodiment, the face detector 104 receives input data from the Motion Color filter 102. As noted above, the face detector 104 includes a classifier. As can be seen in FIG. 2, a first input, Input 1, is the grayscale digital image providing image intensity information to the classifier for determining if an area of the image is probable to contain a face based on geometrical features. For example, the classifier in the face detector 104 may look for geometrical features in an image which correspond to facial characteristics, such as, but not limited to, eyes, face, and nose of a person. A second input, Input2, is the Motion Color Probability image providing information to the classifier for determining if the same area is likely to contain a face based on features in the Motion Color Probability image. The Motion Color Probability image does not contain color, but contains an intensity measure for each pixel defining the probably that that a pixel is a skin color in the original input image 101. The face detector 104, through the use of the classifier, integrates over the region currently being examined, and if the result is above a preset threshold, the area is assumed to contain a face candidate. However, if the result is below the preset threshold, the area is assumed not to contain a face, and the area is not examined further. All areas assumed to contain a face candidate are examined further for faces using traditional face recognition techniques based on the grayscale image.

According to another embodiment, the face detector 104 receives a third input, Input3, from the Motion Color filter 102. The third input, Input3, is the one-bit motion image providing information to the classifier for determining if the same area is probable to contain a face candidate based on features in the image. The motion image contains bright spots where motion was detected, and an examined area is likely to contain a face candidate if the area contains a certain amount of bright pixels. The classifier tests the area by integrating over the examined area, and if the result is higher than a preset threshold value, it is probable that a face candidate is present in the examined area. However, if the result is lower than a preset threshold value, the classifier defines the examined area as unlikely to include a face.

According to one embodiment, the face detector 104 may output, Output1, data to the Motion Color filter 102, as shown in FIG. 2. Specifically, when face detector 104 detects a face in one of the input images, the face detector 104 returns the location of the face to the Motion Color filter 102, as shown in FIG. 1, in the form of size of current test area and a pixel coordinate defining the position of the test area. The occurrence of a positive face detection may provide valuable information about which pixels in the image actually comprise skin colors. Therefore, when detecting a face, the calculating of the Motion Color Histogram in steps S6 and S7, may be modified to calculating a Motion Color Histogram of, for example, only the pixels in the normalized image corresponding to the area representing a detected face.

The above embodiments make it possible to utilize the power of color information to distinguish between objects based on their color, without using a-priori knowledge about the specific color of the object of interest. Instead of pre-defined skin color as a separating feature, the color of interest is found from motion analysis of the scene. By using variants of motion detection approaches, the statistics of the colors of moving objects, relative to the statistics of the colors of stationary objects, are used to create a color sensitive feature which assists in separating moving objects from stationary objects. This moving object color feature is subsequently used as input into an object detection system, where the knowledge of motion is a strong cue.

Figure 7:
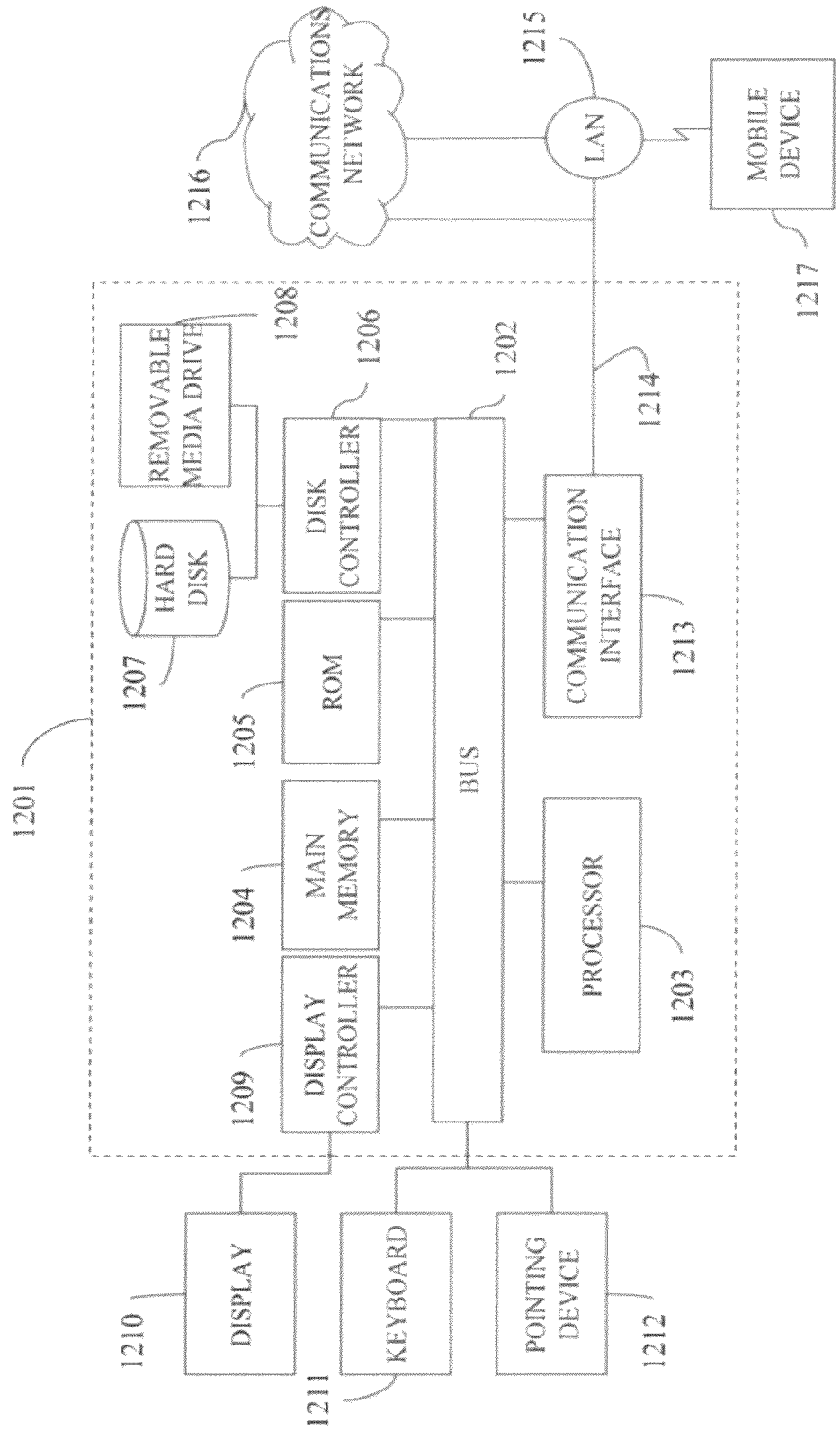
FIG. 7 illustrates an exemplary video processing apparatus, upon which an embodiment of face detection, according to the present disclosure, may be implemented.

FIG. 7 illustrates an exemplary video processing apparatus 1201, upon which an embodiment of face detection, according to the present disclosure, may be implemented. The video processing apparatus may be embodied as a stand alone device or as part of a video conferencing endpoint, a Multipoint Control Unit (MCU), or a content recorder. The computer system 1201 also includes a disk controller 1206 coupled to the bus 1202 to control one or more storage devices for storing information and instructions, such as a magnetic hard disk 1207, and a removable media drive 1208 (e.g., floppy disk drive, read-only compact disc drive, read/write compact disc drive, compact disc jukebox, tape drive, and removable magneto-optical drive). The storage devices may be added to the computer system 1201 using an appropriate device interface (e.g., small computer system interface (SCSI), integrated device electronics (IDE), enhanced-IDE (E-IDE), direct memory access (DMA), or ultra-DMA).

The computer system 1201 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)).

The computer system 1201 may also include a display controller 1209 coupled to the bus 1202 to control a display 1210, such as a touch panel display or a liquid crystal display (LCD), for displaying information to a computer user. The GUI 308, for example, may be displayed on the display 1210. The computer system includes input devices, such as a keyboard 1211 and a pointing device 1212, for interacting with a computer user and providing information to the processor 1203. The pointing device 1212, for example, may be a mouse, a trackball, a finger for a touch screen sensor, or a pointing stick for communicating direction information and command selections to the processor 1203 and for controlling cursor movement on the display 1210. In addition, a printer may provide printed listings of data stored and/or generated by the computer system 1201.

The computer system 1201 performs a portion or all of the processing steps of the present disclosure in response to the processor 1203 executing one or more sequences of one or more instructions contained in a memory, such as the main memory 1204. Such instructions may be read into the main memory 1204 from another computer readable medium, such as a hard disk 1207 or a removable media drive 1208.

One or more processors in a multi-processing arrangement may also be employed to execute the sequences of instructions contained in main memory 1204. In alternative embodiments, hard-wired circuitry may be used in place of or in combination with software instructions. Thus, embodiments are not limited to any specific combination of hardware circuitry and software.

As stated above, the computer system 1201 includes at least one computer readable medium or memory for holding instructions programmed according to the teachings of the present disclosure and for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SDRAM, or any other magnetic medium, compact discs (e.g., CD-ROM), or any other optical medium, punch cards, paper tape, or other physical medium with patterns of holes. Other embodiments may include the use of a carrier wave (described below), or any other medium from which a computer can read. Other embodiments may include instructions according to the teachings of the present disclosure in a signal or carrier wave.

Stored on any one or on a combination of computer readable media, the present disclosure includes software for controlling the computer system 1201, for driving a device or devices for implementing the invention, and for enabling the computer system 1201 to interact with a human user (e.g., print production personnel). Such software may include, but is not limited to, device drivers, operating systems, development tools, and applications software. Such computer readable media further includes the computer program product of the present disclosure for performing all or a portion (if processing is distributed) of the processing performed in implementing the invention.

The computer code devices of the present embodiments may be any interpretable or executable code mechanism, including but not limited to scripts, interpretable programs, dynamic link libraries (DLLs), Java classes, and complete executable programs. Moreover, parts of the processing of the present embodiments may be distributed for better performance, reliability, and/or cost.

The term "computer readable medium" as used herein refers to any medium that participates in providing instructions to the processor 1203 for execution. A computer readable medium, or computer readable storage medium, may take many forms, including but not limited to, non-volatile media or volatile media. Non-volatile media includes, for example, optical, magnetic disks, and magneto-optical disks, such as the hard disk 1207 or the removable media drive 1208. Volatile media includes dynamic memory, such as the main memory 1204. Transmission media includes coaxial cables, copper wire and fiber optics, including the wires that make up the bus 1202. Transmission media may also take the form of acoustic or light waves, such as those generated during radio wave and infrared data communications.

Various forms of computer readable media may be involved in carrying out one or more sequences of one or more instructions to processor 1203 for execution. For example, the instructions may initially be carried on a magnetic disk of a remote computer. The remote computer can load the instructions for implementing all or a portion of the present disclosure remotely into a dynamic memory and send the instructions over a telephone line using a modem. A modem local to the computer system 1201 may receive the data on the telephone line and use an infrared transmitter to convert the data to an infrared signal. An infrared detector coupled to the bus 1202 can receive the data carried in the infrared signal and place the data on the bus 1202. The bus 1202 carries the data to the main memory 1204, from which the processor 1203 retrieves and executes the instructions. The instructions received by the main memory 1204 may optionally be stored on storage device 1207 or 1208 either before or after execution by processor 1203.

The computer system 1201 also includes a communication interface 1213 coupled to the bus 1202. The communication interface 1213 provides a two-way data communication coupling to a network link 1214 that is connected to, for example, a local area network (LAN) 1215, or to another communications network 1216 such as the Internet. For example, the communication interface 1213 may be a network interface card to attach to any packet switched LAN. As another example, the communication interface 1213 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 1213 sends and receives electrical, electromagnetic or optical signals that carry digital data streams representing various types of information.

The network link 1214 typically provides data communication through one or more networks to other data devices. For example, the network link 1214 may provide a connection to another computer through a local network 1215 (e.g., a LAN) or through equipment operated by a service provider, which provides communication services through a communications network 1216. The local network 1214 and the communications network 1216 use, for example, electrical, electromagnetic, or optical signals that carry digital data streams, and the associated physical layer (e.g., CAT 5 cable, coaxial cable, optical fiber, etc.). The signals through the various networks and the signals on the network link 1214 and through the communication interface 1213, which carry the digital data to and from the computer system 1201 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 1201 can transmit and receive data, including program code, through the network(s) 1215 and 1216, the network link 1214 and the communication interface 1213. Moreover, the network link 1214 may provide a connection through a LAN 1215 to a mobile device 1217 such as a personal digital assistant (PDA) laptop computer, or cellular telephone.

Further, it should be appreciated that the present invention is not limited to the exemplary embodiments shown and described above. While this invention has been described in conjunction with exemplary embodiments outlined above, various alternatives, modifications, variations and/or improvements, whether known or that are, or may be, presently unforeseen, may become apparent. Accordingly, the exemplary embodiments of the present disclosure, as set forth above are intended to be illustrative, not limiting. The various changes may be made without departing from the spirit and scope of the invention. Therefore, the disclosure is intended to embrace all now known or later-developed alternatives, modifications, variations and/or improvements.

The invention claimed is:

1. A method for detecting a face in a video stream comprising:
   receiving, at a video processing apparatus, a sequence of input color images; and
   for each input image, processing the sequence at the video processing apparatus, wherein the process includes,
      calculating a greyscale image of the input color image,
      creating a one-bit motion image based on the current greyscale image and a previous greyscale image,
      calculating a normalized color image of the input color image,
      calculating a motion color probability image by,
         calculating a first color histogram of the pixels in the normalized image,
         calculating a second color histogram of the pixels in the normalized image corresponding to pixels in the motion image defined as being in motion,
         calculating a ratio histogram by dividing the first color histogram by the second color histogram, and
         setting pixel values in the motion color probability image to a value obtained by indexing the ratio histogram using values from the original normalized image,
      providing at least the grayscale image and the motion color probability image to a face detector, and
      executing face detection by determining a presence of a face based on first features in the grayscale image and second features in the motion color probability image.

2. The method according to claim 1, wherein the first features include geometrical features or patterns.

3. The method according to claim 1, wherein the second features include intensity information, the intensity information defining the presence or non-presence of assumed skin colors.

4. The method according to claim 1, further comprising:
   providing the motion image to the face detector, wherein the presence of a face is further based on third features in the motion image.

5. The method according to claim 1, wherein the input color image is in the RGB color space, and wherein the normalized image is created by converting a copy of the input color image to the RG chromaticity space.

6. The method according to claim 1, wherein when the face detector detects a face in one of the input images, the calculating of the motion color probability image extracts the location of the detected face and calculates a second color histogram of the pixels representing the detected face.

7. The method according to claim 1, wherein the receiving of the sequence of input color images is received from a static video camera.

8. An apparatus for detecting a face in a video stream comprising:
   a video processor that receives a sequence of input color images; and
   for each input image, the video processor,
      calculates a greyscale image of the input color image,
      creates a one-bit motion image based on the current greyscale image and a previous greyscale image,
      calculates a normalized color image of the input color image,
      calculates a motion color probability image, wherein the video processor further,
         calculates a first color histogram of the pixels in the normalized image,
         calculates a second color histogram of the pixels in the normalized image corresponding to pixels in the motion image defined as being in motion,
         calculates a ratio histogram by dividing the first color histogram by the second color histogram, and
         sets pixel values in the motion color probability image to a value obtained by indexing the ratio histogram using values from the original normalized image,
      provides at least the grayscale image and the motion color probability image to a face detector, and
      executes face detection by determining a presence of a face based on first features in the grayscale image and second features in the motion color probability image.

9. The apparatus according to claim 8, wherein the first features include geometrical features or patterns.

10. The apparatus according to claim 8, wherein the second features include intensity information, the intensity information defining the presence or non-presence of is assumed skin colors.

11. The apparatus according to claim 8, wherein the video processor further provides the motion image to the face detector, and wherein the presence of a face is further based on third features in the motion image.

12. The apparatus according to claim 8, wherein the input color image is in the RGB color space, and wherein the normalized image is created by converting a copy of the input color image to the RG chromaticity space.

13. The apparatus according to claim 8, wherein when the face detector detects a face in one of the input images, the video processor extracts the location of the detected face and calculates a second color histogram of the pixels representing the detected face.

14. The apparatus according to claim 8, wherein the video processor receives the sequence of input color images from a static video camera.

15. A non-transitory computer readable storage medium encoded with computer executable instructions, wherein the instructions, when executed by a video processing apparatus, cause the video processing apparatus to perform a method for detecting a face in a video stream, the method comprising:

receiving, at the video processing apparatus, a sequence of input color images; and for each input image, processing the sequence at the video processing apparatus, wherein the process includes, calculating a greyscale image of the input color image, creating a one-bit motion image based on the current greyscale image and a previous greyscale image, calculating a normalized color image of the input color image, calculating a motion color probability image by, calculating a first color histogram of all the pixels in the normalized image, calculating a second color histogram of the pixels in the normalized image corresponding to pixels in the motion image defined as being in motion, calculating a ratio histogram by dividing the first color histogram by the second color histogram, and setting pixel values in the motion color probability image to a value obtained by indexing the ratio histogram using values from the original normalized image, providing at least the grayscale image and the motion color probability image to a face detector, and executing face detection by determining a presence of a face based on first features in the grayscale image and second features in the motion color probability image.

16. The computer readable medium according to claim 15, wherein the first features include geometrical features or patterns.

17. The computer readable medium according to claim 15, wherein the second features include intensity information, the intensity information defining the presence or non-presence of assumed skin colors.

18. The computer readable medium according to claim 15, further comprising:

providing the motion image to the face detector, wherein the presence of a face is further based on third features in the motion image.

19. The computer readable medium according to claim 15, wherein the input color image is in the RGB color space, and wherein the normalized image is created by converting a copy of the input color image to the RG chromaticity space.

20. The computer readable medium according to claim 15, wherein when the face detector detects a face in one of the input images, the calculating of the motion color probability image extracts the location of the detected face and calculates a second color histogram of the pixels representing the detected face.

\* \* \* \* \*

UNITED STATES PATENT AND TRADEMARK OFFICE
CERTIFICATE OF CORRECTION

PATENT NO. : 8,260,011 B2
APPLICATION NO. : 12/642390
DATED : September 4, 2012
INVENTOR(S) : Per Ove Husoy Page 1 of 1

It is certified that error appears in the above-identified patent and that said Letters Patent is hereby corrected as shown below:

In the Claims:

Claim 1:
column 11, line 55, should read: calculating a ratio histogram by dividing the ~~first~~ second color...

column 11, line 56, should read: histogram by the ~~second~~ first color histogram, and...

Claim 8:
column 12, line 39, should read: calculates a ratio histogram by dividing the ~~first~~ second color...

column 12, line 40, should read: histogram by the ~~second~~ first color histogram, and...

Claim 15:
column 13, line 24, should read: calculating a ratio histogram by dividing the ~~first~~ second color...

column 13, line 25, should read: histogram by the ~~second~~ first color histogram, and...

Signed and Sealed this
Eleventh Day of June, 2013

Teresa Stanek Rea
*Acting Director of the United States Patent and Trademark Office*